(12) United States Patent
Sueto et al.

(10) Patent No.: US 11,933,383 B2
(45) Date of Patent: Mar. 19, 2024

(54) TWISTED CORD FOR CORE WIRE OF TRANSMISSION BELT, MANUFACTURING METHOD AND USE OF SAME, AND TRANSMISSION BELT

(71) Applicant: Mitsuboshi Belting Ltd., Kobe (JP)

(72) Inventors: Yosuke Sueto, Hyogo (JP); Takuya Tomoda, Hyogo (JP); Mayu Esaka, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 241 days.

(21) Appl. No.: 17/611,629

(22) PCT Filed: May 15, 2020

(86) PCT No.: PCT/JP2020/019534
§ 371 (c)(1),
(2) Date: Nov. 16, 2021

(87) PCT Pub. No.: WO2020/230897
PCT Pub. Date: Nov. 19, 2020

(65) Prior Publication Data
US 2022/0243785 A1    Aug. 4, 2022

(30) Foreign Application Priority Data

May 16, 2019  (JP) .................................. 2019-093051
May 1, 2020   (JP) .................................. 2020-081456

(51) Int. Cl.
*F16G 1/28*     (2006.01)
*B29C 53/14*    (2006.01)
(Continued)

(52) U.S. Cl.
CPC ................ *F16G 1/28* (2013.01); *B29C 53/14* (2013.01); *B29K 2105/103* (2013.01); *B29K 2995/0094* (2013.01); *B29L 2031/7094* (2013.01)

(58) Field of Classification Search
USPC ..................................................... 474/205, 260
See application file for complete search history.

(56) References Cited

U.S. PATENT DOCUMENTS 5,259,822 A * 11/1993 Nakanishi ............... B29C 70/16
                                                         474/263
8,568,260 B2 * 10/2013 Baldovino ................ F16G 1/28
                                                         474/271
(Continued)

FOREIGN PATENT DOCUMENTS

CN      1934300 A     3/2007
CN    103835045 A     6/2014
(Continued)

OTHER PUBLICATIONS

Dec. 2, 20222—(EP) Extended Search Report—App 20806652.2.
(Continued)

*Primary Examiner* — Henry Y Liu
(74) *Attorney, Agent, or Firm* — Banner & Witcoff, Ltd.

(57) ABSTRACT

The present invention relates to a twisted cord for constituting a core wire of a power-transmission belt, the twisted cord including a plurality of primary twisted yarns that are bundled and secondarily-twisted, in which when secondary twist is untwisted by 25 cm, a difference in length between the longest primary twisted yarn L and the shortest primary twisted yarn S among the plurality of primary twisted yarns is 1 to 10 mm.

10 Claims, 8 Drawing Sheets

(51) Int. Cl.
*B29K 105/10* (2006.01)
*B29L 31/00* (2006.01)

(56) References Cited

U.S. PATENT DOCUMENTS

| | | | |
|---|---|---|---|
| 2007/0214765 A1* | 9/2007 | Teshima | D02G 3/32 57/293 |
| 2014/0237983 A1* | 8/2014 | Love | D02G 3/04 57/58.7 |
| 2016/0376733 A1* | 12/2016 | Jeon | D02G 3/40 57/237 |
| 2017/0106698 A1 | 4/2017 | Jeon et al. | |
| 2018/0223953 A1* | 8/2018 | Harada | B32B 3/30 |
| 2021/0114414 A1* | 4/2021 | Lee | C08L 77/02 |
| 2021/0115599 A1* | 4/2021 | Nayuki | D02G 3/48 |
| 2021/0190176 A1* | 6/2021 | Yokoyama | D02G 3/04 |

FOREIGN PATENT DOCUMENTS

| | | |
|---|---|---|
| JP | 2017-014678 A | 1/2017 |
| JP | 2019-007618 A | 1/2019 |
| KR | 20180064592 A | 6/2018 |
| WO | 2014-042672 A1 | 3/2014 |
| WO | 2018075305 A1 | 4/2018 |
| WO | 2018101668 A1 | 6/2018 |
| WO | 2018-181211 A1 | 10/2018 |
| WO | 2018-235755 A1 | 12/2018 |

OTHER PUBLICATIONS

Aug. 2, 2022—(CN) Notification of First Office Action—App 202080035233.9.
Jul. 2, 20208—International Search Report—Intl App PCT/JP2020/019534.
Feb. 2, 20235—(CN) Notification of the Second Office Action—App 202080035233.9.

* cited by examiner (a)　　　　　　　　　(b)

US 11,933,383 B2

TWISTED CORD FOR CORE WIRE OF TRANSMISSION BELT, MANUFACTURING METHOD AND USE OF SAME, AND TRANSMISSION BELT

CROSS REFERENCE TO RELATED APPLICATIONS

This is a U.S. National Phase Application under 35 U.S.C. § 371 of International Application No. PCT/JP2020/019534, filed May 15, 2020, which claims priority to Japanese Application Nos. 2019-093051, filed May 16, 2019, and 2020-081456, filed May 1, 2020, which were published Under PCT Article 21(2), the entire contents of which are incorporated herein by reference.

TECHNICAL FIELD

The present invention relates to a twisted cord that is used as a core wire of a power-transmission belt and obtained by mixing and twisting primary twisted yarns to which tension is unevenly applied, a production method and use thereof, and a power-transmission belt.

BACKGROUND ART

In order to transmit power, a power-transmission belt in which a twisted cord is embedded as a core wire is widely used. In order to increase the transmission power of the power-transmission belt, it is necessary to use high-modulus fibers such as aramid fibers to reduce elongation during use of the belt. On the other hand, in a V-ribbed belt produced by a mold forming method, a core wire is required to have a relatively large elongation during the production of the belt. Therefore, a V-ribbed belt used under high load is required to have contradictory characteristics of large elongation during the production of the belt and small elongation during use of the belt.

To meet such requirements, for example, Patent Literature 1 discloses a V-ribbed belt that includes a twisted cord obtained by mixing and twisting a high-elongation aramid fiber having an intermediate elongation of 0.8% or more under a load of 4 cN/dtex and a tensile elastic modulus of 50 to 100 GPa and a low-modulus fiber having a tensile elastic modulus lower than that of the high-elongation aramid fiber. It is stated that, by adopting such a configuration, it is possible to prevent disturbance and damage of a pitch of the core wire during the production by the mold forming method, and it is also possible to maintain noise suppression and durability even when the belt is used for an application having high dynamic tension.

Further, Patent Literature 2 discloses a hybrid tire cord which includes a nylon primary twisted yarn and an aramid primary twisted yarn, and in which the nylon primary twisted yarn and the aramid primary twisted yarn are secondarily-twisted together, and in the hybrid tire cord having a predetermined length, a length of the aramid primary twisted yarn is 1.005 times to 1.025 times a length of the nylon primary twisted yarn after the untwist of the secondary twisted yarns. It is stated that, by adopting such a configuration, it is possible to prevent the problem that stress is intensively applied to the aramid primary twisted yarn and the fatigue resistance characteristics of the tire cord decrease when the tension and compression of the tire are repeated. In addition, it is stated that since the hybrid tire cord has a stable structure in which the aramid primary twisted yarn and the nylon primary twisted yarn are twisted at substantially the same ratio, it is possible to minimize the physical property deviation and the defect rate caused in the production process as compared with the related art of a covering structure.

CITATION LIST

Patent Literature

Patent Literature 1: JP-A-2019-7618 (claim 1, paragraph [0010])
Patent Literature 2: JP-A-2017-14678 (claim 1, paragraph [0034])

SUMMARY OF INVENTION

Technical Problem

In the configuration described in Patent literature 1, a high-elongation aramid fiber is an essential and a general-purpose aramid fiber cannot be applied, and thus there is a problem in terms of availability and cost. An object of the configuration described in Patent Literature 2 is to improve fatigue resistance characteristics of the tire cord, and a problem related to production and use of a power-transmission belt is not considered.

An object of the present invention is to provide a twisted cord for a core wire of a power-transmission belt, which has the elongation of the core wire required during the production, and has reduced elongation of the core wire during use and high tensile strength, a method for producing the twisted cord, a use of the twisted cord, and a power-transmission belt.

Another object of the present invention is to provide a twisted cord for a core wire of a power-transmission belt that can be produced easily and inexpensively, a method for producing the twisted cord, a use of the twisted cord, and a power-transmission belt.

Still another object of the present invention is to provide a twisted cord for a core wire capable of improving durability of a power-transmission belt, a method for producing the twisted cord, a use of the twisted cord, and a power-transmission belt.

Solution to Problem

As a result of intensive studies to achieve the above object, the present inventors have found that, as a twisted cord for constituting a core wire of a power-transmission belt, a twisted cord is formed by a plurality of primary twisted yarns in which lengths of primary twisted yarns in an untwisted state are different due to secondary twisting at different tension, whereby the twisted cord has elongation of the core wire required during the production of the power-transmission belt, the elongation of the core wire is reduced during use, and the tensile strength of the power-transmission belt can be improved, and have completed the present invention.

That is, the twisted cord for a core wire of the present invention is a twisted cord for constituting a core wire of a power-transmission belt, the twisted cord including a plurality of primary twisted yarns that are bundled and secondarily-twisted, in which when secondary twist is untwisted by 25 cm, a difference in length between the longest primary twisted yarn L and the shortest primary twisted yarn S among the plurality of primary twisted yarns is 1 to 10 mm. The primary twisted yarn L may include a high-modulus fiber, and the primary twisted yarn S may include a low-modulus fiber. A twist coefficient of the primary twisted yarn L may be 2 to 5 times a twist coefficient of the primary twisted yarn S. The twisted cord may be a Lang lay cord. In the twisted cord, the plurality of primary twisted yarns may include a plurality of primary twisted yarns including a high-modulus fiber and one primary twisted yarn including a low-modulus fiber. A mass ratio of the high-modulus fiber to the low-modulus fiber (the former/the latter) may be about 60/40 to 95/5.

The present invention also includes a method of producing the twisted cord for core wire, in which the plurality of primary twisted yarns are secondarily-twisted while setting a tension applied to the primary twisted yarn S to be larger than a tension applied to the primary twisted yarn L. In the production method, the tension applied to the primary twisted yarn S may be 0.12 to 0.53 gf/dtex.

The present invention also includes a power-transmission belt including a core wire including the twisted cord. The power-transmission belt may be a V-ribbed belt.

The present invention also includes a method of using, as a core wire of a power-transmission belt, the twisted cord obtained by bundling and secondarily-twisting the plurality of primary twisted yarns.

Advantageous Effects of Invention

In the present invention, as the twisted cord for forming the core wire of the power-transmission belt, a plurality of primary twisted yarns adjusted to have different lengths in an untwisted state by applying different tension during secondary twist are mixed and twisted, and therefore the twisted cord has elongation of the core wire required during the production of the power-transmission belt, and the elongation of the core wire is reduced during use, and the tensile strength of the power-transmission belt can be improved. Furthermore, since a general-purpose aramid fiber can be used, the twisted cord can be manufactured easily and inexpensively. In addition, the power-transmission belt including the core wire has excellent durability, can maintain high tensile strength over a long period of time, and can prevent breakage of the belt.

DESCRIPTION OF EMBODIMENTS

Figure 1:
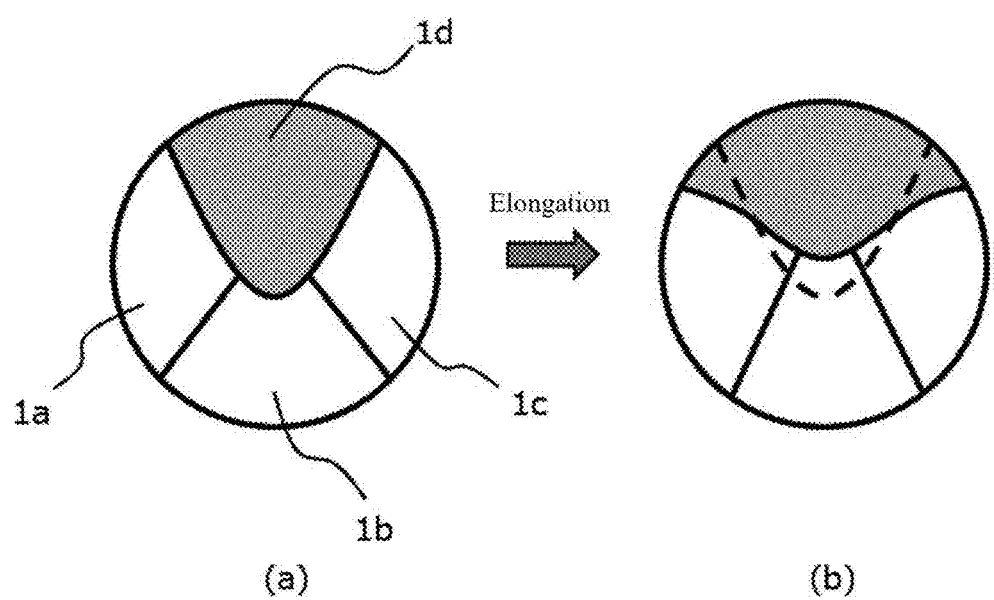
FIG. 1 is a schematic cross-sectional view illustrating a change in a structure of a twisted cord of the present invention before and after production of a belt.

Hereinafter, an example of an embodiment of the present invention will be described with reference to the drawings.

Twisted Cord

In a twisted cord of the present invention, when a twisted cord obtained by bundling and secondarily-twisting a plurality of primary twisted yarns is untwisted (untwisting secondary twisted yarns) by a length of 25 cm, a difference in length between the longest primary twisted yarn L (first primary twisted yarn in a loosened state) and the shortest primary twisted yarn S (second primary twisted yarn extending linearly) among the plurality of primary twisted yarns is 1 to 10 mm.

In the present invention, by utilizing a property that a primary twisted yarn, which is secondarily-twisted by being applied with a stronger tension, contracts more greatly when being untwisted, tension applied to a plurality of primary twisted yarns is changed during the secondary twisting, and as a result, the plurality of primary twisted yarns after being untwisted can be adjusted to different lengths, That is, the fact that "there is a difference in the lengths of the primary twisted yarns" in the present invention means that "the alignment of the primary twisted yarns is poor", but such a feature of the present invention is a feature that is not easily predictable from the conventional art of a power-transmission belt in which making the applied tension uniform in order to improve the alignment of the primary twisted yarns is common technical knowledge. In the conventional art, it is possible to increase the elongation of a twisted cord by increasing the number of low-modulus fibers or increasing the number of twists after improving the alignment of the primary twisted yarns. However, in this case, there is a disadvantage that the elongation increases not only when the belt is produced but also when the belt is used. In contrast, the present invention is successful to prevent the elongation during the use of the belt while ensuring the elongation necessary for producing the belt owing to the above-described features. Specifically, in the present invention, the tension applied to the primary twisted yarns is different, so that the primary twisted yarns can be structurally changed in the twisted cord when a tensile force is applied during the production of the belt, and the elongation can be increased. The elongation owing to the change in structures of the primary twisted yarns in the twisted cord of the present invention is exhibited only during the production of the belt, and is not exhibited during the use of the belt in which the structural change was completed. Therefore, it is possible to obtain a remarkable effect that the elongation during the production of the belt is increased while keeping the elongation during use of the belt to be small, which cannot be easily conceived from the conventional art.

The difference in length between the primary twisted yarn L and the primary twisted yarn S is within the range of 1 to 10 mm, and is preferably about 2 to 8 mm, more preferably about 3 to 5 mm, and most preferably about 3.3 to 4 mm. When the difference is too small, there is a concern that the elongation is reduced and the durability of the belt decreases. Conversely, when the difference in length between the primary twisted yarn L and the primary twisted yarn S is too large, there is a concern that the tensile strength decreases, the tensile strength of the belt also decreases and break is likely to occur during the use, and in addition, the elongation of the belt is increased to cause a transmission failure and the heat generation due to the slip increases to decrease the durability.

It is preferable that the plurality of primary twisted yarns include primary twisted yarns including high modulus fibers and primary twisted yarns including low modulus fibers. In particular, it is preferable that the primary twisted yarn L includes high-modulus fibers, and the primary twisted yarn S includes low-modulus fibers. The reason can be estimated as follows. That is, a position of the primary twisted yarn S including the low-modulus fibers is easily changed toward the outside of the core wire while allowing elongation in the twisted cord. Therefore, a structural change can easily occur, and the elongation of the twisted cord during the production of the belt can be increased. On the other hand, when the tensile force acts on the primary twisted yarn L including the high-modulus fibers during the production of the belt, a force acts to move the primary twisted yarn L toward a center direction of the twisted cord. Therefore, the primary twisted yarn S including the low-modulus fibers is easily moved outward.

When the twisted cord includes primary twisted yarns including high-modulus fibers and primary twisted yarns including low-modulus fibers, the number of the primary twisted yarns including high-modulus fibers is one or more, but in view of promoting structural changes during the production of the belt, the number is preferably plural, for example, 2 to 6, preferably 2 to 5, more preferably 2 to 4, and most preferably 3. When the number of the primary twisted yarns including the high-modulus fibers is within such a range, a high tensile strength can be maintained for a long time, and the durability of the power-transmission belt can be improved. The number of the primary twisted yarns including the low-modulus fibers is also one or more, but from the viewpoint of improving the tensile strength of the belt, the number is preferably 3 or less, more preferably 2 or less, and most preferably 1.

Therefore, it is preferable that the plurality of primary twisted yarns are a combination of a plurality of primary twisted yarns including high-modulus fibers and one primary twisted yarn including low-modulus fibers. It is preferable that the plurality of primary twisted yarns including the high-modulus fibers include the primary twisted yarn L. In view of the productivity and the like, it is particularly preferable that the plurality of primary twisted yarns have substantially the same length when being untwisted, and all the primary twisted yarns including the high-modulus fibers are the primary twisted yarn L. It is preferable that one primary twisted yarn including the low-modulus fibers is the primary twisted yarn S.

Figure 2:
FIG. 2 is a cross-sectional photograph of a twisted cord before elongation before the production of the belt.
Figure 3:
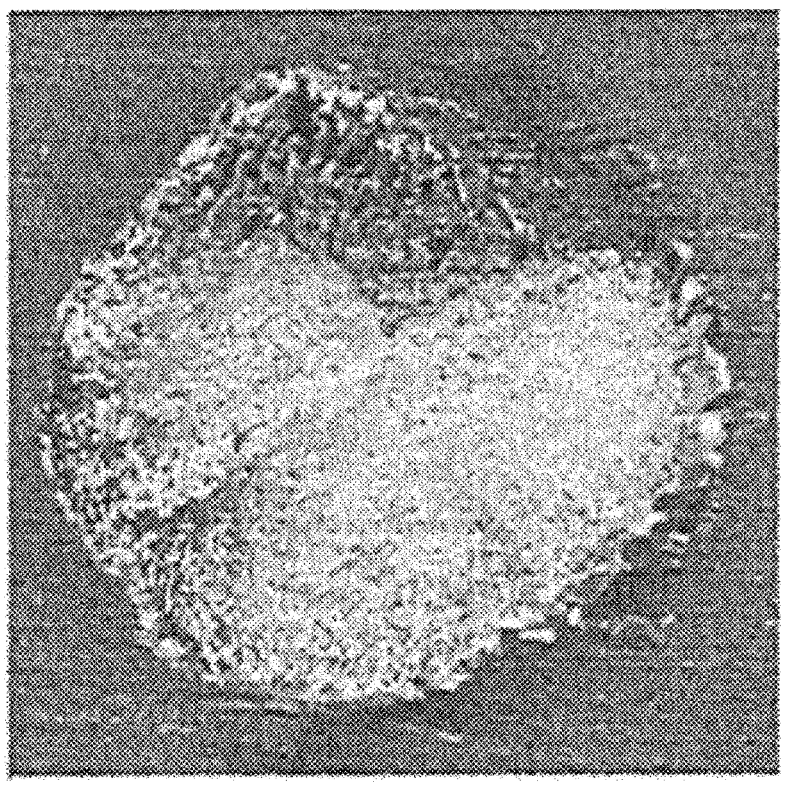
FIG. 3 is a cross-sectional photograph of the twisted cord after elongation after the production of the belt.

That is, it is particularly preferable that the plurality of primary twisted yarns are a combination of a plurality of primary twisted yarns L that include high-modulus fibers and have substantially the same length when being untwisted and one primary twisted yarn S including low-modulus fibers. With such a combination, the structural change described above is likely to occur. For example, FIGS. 1 to 3 show a twisted cord obtained by mixing and twisting three primary twisted yarns L which include aramid fibers as high-modulus fibers and to which the same tension is applied and one primary twisted yarn S which includes nylon fibers as low-modulus fibers and to which tension larger than that of the primary twisted yarns L is applied. FIG. 1 is a schematic cross-sectional view illustrating a change in a structure of the twisted cord before and after the production of the belt. The (a) of FIG. 1 is a cross-sectional view of a twisted cord before a tensile force is applied in a length direction of the twisted cord at the time of expansion of a flexible jacket during the production of the belt. The twisted cord is formed of three primary twisted yarns 1a, 1b, 1c which include aramid fibers as high-modulus fibers and to which the same tension is applied and one primary twisted yarn 1d which includes nylon fibers as low-modulus fibers and to which tension larger than that of the primary twisted yarns (1a, 1b, 1c) is applied. Before the elongation, the twisted cord has a structure in which the primary twisted yarns 1a, 1b, 1c corresponding to the primary twisted yarn L do not exist in the vicinity of a center of the cross section, and the primary twisted yarn 1d corresponding to the primary twisted yarn S occupies the vicinity of the center of the cross section. Such a structure of the twisted cord can be formed by applying a tension stronger than that of the primary twisted yarn L to the primary twisted yarn S, as will be described later. When the tensile force acts on the twisted cord before the production of the belt in the length direction, a structural change occurs in which the primary twisted yarn 1d moves to a peripheral part. The (b) of FIG. 1 is a cross-sectional view of the twisted cord after the tensile force is applied, and the structure is changed to a structure in which an oblique line portion showing the structure of the primary twisted yarn before the tensile force is applied is recessed and the primary twisted yarn 1d expands in a circumferential direction.

FIG. 2 is a photograph of an actual twisted cord corresponding to (a) of FIG. 1. FIG. 2 is a cross-sectional photograph of the twisted cord before elongation before the production of the belt, in which a black part indicates the primary twisted yarn S, and the primary twisted yarn S enters (or gets into) the vicinity of the center of the circular cross-sectional shape. That is, the cross-sectional shape of the primary twisted yarn S is a fan shape having a relatively acute angle in which a top portion is positioned in the vicinity of the center of the twisted cord. In contrast, FIG. 3 is a cross-sectional photograph of the twisted cord after being elongated after the production of the belt, and as compared with FIG. 2, the black part indicating the primary twisted yarn S is driven away (or pushed out) from the vicinity of the center of the cross-sectional shape in the circumferential direction (or the radial direction). That is, the primary twisted yarn S does not exist in the vicinity of the center of the circular cross-sectional shape, and the cross-sectional shape of the primary twisted yarn S also changes to a fan shape having a gentler angle than that in FIG. 2.

That is, as is clear from the Examples described later, when the primary twisted yarn L and the primary twisted yarn S are mixed and twisted (secondarily-twisted) with the same tension as described in the conventional art, the primary twisted yarn L tends to be in the vicinity of the center and the primary twisted yarn S tends to be in the peripheral part presumably because the rigidity of the primary twisted yarn L is high. In the present invention, by applying a high tension to the primary twisted yarn S, a twisted cord having a structure shown in (a) of FIG. 1 and FIG. 2 is produced, and the structure is changed to a structure shown in (b) of FIG. 1 and FIG. 3 due to the elongation associated with the production of the belt, and thus, the stretchability required during the production of the belt is ensured. Since such a change in the structure occurs during the production of the belt, the change in the structure hardly occurs during the use of the belt. Therefore, the elongation during use is reduced and the tensile strength can be improved.

The twisted cord may be plied twist in which the directions of the primary twist and the secondary twist are opposite to each other, but in view of being excellent in bending fatigue resistance, being able to maintain tensile strength over a long period of time, and being able to enhance the durability of the power-transmission belt, it is preferable to employ a Lang's twist in which the directions of the primary twist and the secondary twist are the same.

The primary twist coefficient of the primary twisted yarn L is, for example, about 0.1 to 5, preferably about 0.3 to 3.5 (e.g., about 0.3 to 3), more preferably about 0.5 to 2 (e.g., about 1.2 to 1.8), and most preferably about 1 to 1.5. When the primary twist coefficient of the primary twisted yarn L is too small, there is a concern that the elongation is reduced. Conversely, when the primary twist coefficient is too large, there is a concern that the tensile strength decreases, the elongation of the belt increases to cause a transmission failure, heat generation due to slip increases, the tensile strength also decreases and break is likely to occur, and the durability decreases.

The primary twist coefficient of the primary twisted yarn S is, for example, about 0.1 to 3, preferably about 0.2 to 1, more preferably about 0.3 to 0.8, and most preferably about 0.4 to 0.6. When the primary twist coefficient of the primary twisted yarn S is too small, the elongation may be reduced. Conversely, when the primary twist coefficient is too large, the tensile strength may decrease, the elongation of the belt may increase to cause a transmission failure, the heat generation due to slip may increase to decrease the durability.

The twist coefficient of the primary twisted yarn L may be 1.5 to 10 times (e.g., 1.5 to 7 times) the twist coefficient of the primary twisted yarn S, and is, for example, about 2 to 6 times (e.g., about 2 to 5 times), preferably about 2.5 to 4 times, and more preferably about 2.5 to 3.5 times. When the primary twisted yarn L includes high-modulus fibers, the primary twisted yarn L including the high-modulus fibers tends to have low bending fatigue resistance. Therefore, it is preferable to increase the twist coefficient to improve the bending fatigue resistance. When a ratio of the twist coefficient of the primary twisted yarn L to the twist coefficient of the primary twisted yarn S is too small, the effect of improving the bending fatigue resistance is not sufficient. Conversely, when the ratio is too large, the elongation during the use of the belt may increase, the tensile strength may also decrease, and the durability of the belt may decrease.

The secondary twist coefficient of the twisted cord can be selected from a range of about 2 to 6, and is, for example, about 2.5 to 5.5, preferably about 3 to 5, and more preferably about 3 to 4.5 (particularly about 3 to 4). When the secondary twist coefficient is too large, the tensile strength may decrease, the elongation of the belt may increase to cause a transmission failure, and the heat generation due to slip may increase and the durability may decrease. On the other hand, when the secondary twist coefficient is too small, the bending fatigue resistance may decrease to decrease the durability of the belt.

The secondary twist coefficient may be 1 to 10 times the primary twist coefficient of the primary twisted yarn L, and is, for example, about 1.2 to 5 times, preferably about 1.3 to 3 times, and more preferably about 1.5 to 2.5 times. By making the secondary twist coefficient with respect to the primary twist coefficient, the bending fatigue resistance can be improved, and the durability can be improved.

In the present application, each twist coefficient of the primary twist coefficient and the secondary twist coefficient can be calculated based on the following equation.

Twist coefficient=[the number of twists(times/*m*)× √total fineness(tex)]/960.

The total fineness of the twisted cord (secondary twisted yarn) can be selected from a range of, for example, about 1000 to 10000 dtex, and is, for example, about 2000 to 8000 dtex, preferably about 2500 to 7000 dtex, and more preferably about 3000 to 6000 dtex (particularly about 3500 to 5000 dtex). When the total fineness is too small, the elongation may increase and the life may be shortened. When the total fineness is too large, the life may be shortened since the bending fatigue resistance decreases.

In the plurality of primary twisted yarns, a mass ratio of the high-modulus fibers to the low-modulus fibers (high-modulus fibers/low-modulus fibers) may be about 50/50 to 99/1, and is, for example, about 60/40 to 95/5, preferably about 60/40 to 90/10, and more preferably about 70/30 to 90/10 (particularly about 75/25 to 85/15). When the proportion of the high-modulus fibers is too small, the tensile strength during use of the belt may decrease. Conversely, when the proportion is too large, the elongation during the production of the belt may decrease, and the pitch of the core wire may be disturbed and damage may occur.

As the high-modulus fibers and the low-modulus fibers constituting the primary twisted yarn, the following fibers can be used.

High-Modulus Fiber

The tensile elastic modulus of the high-modulus fibers is about 40 to 600 GPa, preferably about 40 to 100 GPa, and more preferably about 50 to 70 GPa. When the tensile elastic modulus is too large, the elongation during the production may decrease, and conversely, when the tensile elastic modulus is too small, the tensile strength during the use may decrease.

In the present application, the tensile elastic modulus can be measured by a method of measuring a load-elongation curve according to the method described in JIS L1013 (2010) and determining an average inclination in a region under a load of 1000 MPa or less.

Examples of the high-modulus fibers include aramid fibers (fully aromatic polyamide fibers), fully aromatic polyester fibers, polyparaphenylene benzobisoxazole (PBO) fibers, carbon fibers, and glass fibers. These high-modulus fibers can be used alone or in combination of two or more kinds. Among these, the aramid fibers are preferred.

The aramid fibers as a raw yarn are generally a para-aramid multifilament yarn containing a para-aramid fiber. The para-aramid multifilament yarn contains a monofilament yarn of para-aramid fibers, and may include a monofilament yarn of another fiber (polyester fiber or the like) as necessary. The proportion of the para-aramid fibers may be 50 mass % or more (particularly 80 to 100 mass %) relative to the total monofilament yarn (multifilament yarn), and generally, all monofilament yarns are formed of the para-aramid fibers.

The multifilament yarn includes a plurality of monofilament yarns, and may include, for example, about 100 to 5000 monofilament yarns, preferably about 300 to 2000 monofilament yarns, and more preferably about 600 to 1000 monofilament yarns. The average fineness of the monofilament yarn may be, for example, about 0.8 to 10 dtex, preferably about 0.8 to 5 dtex, and more preferably about 1.1 to 1.7 dtex.

The aramid fiber as a raw yarn may be a para-aramid fiber as a single repeating unit (e.g., "Twaron (registered trademark)" manufactured by Teijin Limited, which is a polyparaphenylene terephthalamide fiber, or "Kevlar (registered trademark)" manufactured by Du Pont-Toray Co., Ltd.), or may be a copolymerized para-aramid fiber containing a plurality of repeating units (e.g., "Technora" manufactured by Teijin Limited, which is a copolymerized aramid fiber of polyparaphenylene terephthalamide and 3,4'-oxydiphenylene terephthalamide).

The average fineness of the high-modulus fibers (in the case of a plurality of fibers, each high-modulus fiber) can be selected from a range of about 500 to 3000 dtex, and may be, for example, about 600 to 2000 dtex, preferably about 700 to 1700 dtex, and more preferably about 800 to 1500 dtex (particularly about 1000 to 1200 dtex). When the fineness is too small, the elongation may increase and the life may be shortened. Conversely, when the fineness is too large, the life may be shortened since the bending fatigue resistance decreases. The range of the fineness of these high-modulus fibers may be the range of the fineness of the primary twisted yarn L.

Low-modulus Fiber

The tensile elastic modulus of the low-modulus fibers is 0.1 to 30 GPa, preferably 0.5 to 10 GPa, and more preferably about 1 to 5 GPa. When the tensile elastic modulus is too large, the elongation during the production may decrease, and conversely, when the tensile elastic modulus is too small, the tensile strength during the use may decrease.

Examples of the low-modulus fibers include a synthetic fiber such as a polyolefin fiber (such as a polyethylene fiber and a polypropylene fiber), a polystyrene fiber, a fluorocarbon fiber such as polytetratluoroethylene, an acrylic fiber, a polyvinyl chloride fiber, a polyvinylidene chloride fiber, a vinyl alcohol fiber such as a vinylon fiber and polyvinyl alcohol, a polyimide fiber (such as a polyamide-6 fiber, a polyamide-66 fiber, and a polyamide-46 fiber), a polyester fiber (a polyalkylene arylate fiber) [a poly $C_{2-4}$alkylene-$C_{6-14}$ acrylate fiber such as a polyethylene terephthalate (PET) fiber and a polyethylene naphthalate (PEN) fiber], and a polyurethane fiber; a natural fiber such as cotton, hemp, and wool; and a regenerated fiber such as rayon. These low-modulus fibers can be used alone or in combination of two or more kinds. Among these, aliphatic polyamide fibers such as nylon 6 and nylon 66 are preferred.

The low-modulus fiber, which is a raw yarn, is also generally a multifilament yarn. The multifilament yarn may be formed of the same kind of monofilament yarns or may be formed of different kinds of monofilament yarns. The number and average fineness of the monofilament yarn can be selected from the same ranges as those of the multifilament yarn of the aramid fibers (high-modulus fibers).

The average fineness of the low-modulus fiber (in the case of a plurality of fibers, each low-modulus fiber) can be selected from a range of about 500 to 3000 dtex, and may be, for example, about 600 to 2000 dtex, preferably about 700 to 1500 dtex, and more preferably about 800 to 1200 dtex (particularly about 850 to 1000 dtex). When the fineness is too small, the elongation may increase, and the life may be shortened. Conversely, when the fineness is too large, the life may be shortened since the bending fatigue resistance may decrease. The range of the fineness of these low-modulus fibers may be the range of the fineness of the primary twisted yarn S.

Method of Producing Twisted Cord

The twisted cord of the present invention is generally obtained by causing the tension applied to the primary twisted yarn S to be larger than the tension applied to the primary twisted yarn L and secondarily-twisting the plurality of primary twisted yarns.

In this production method, the length of the primary twisted yarn S after being untwisted can be made sufficiently smaller than the length of the primary twisted yarn L by increasing the tension applied to the primary twisted yarn S. In addition, when the primary twisted yarn S is secondarily-twisted while applying a high tension thereto, the primary twisted yarn S can be disposed so as to enter the vicinity of the center of the twisted cord, and a structural change in which the primary twisted yarn S moves to the peripheral part in the twisted cord can easily occur during the production of the belt.

The tension applied to the primary twisted yarn S is, for example, about 0.12 to 0.53 gf/dtex, preferably about 0.15 to 0.5 gf/dtex, more preferably about 0.18 to 0.4 gf/dtex, and most preferably about 0.2 to 0.3 gf/dtex.

The tension applied to the primary twisted yarn L is, for example, about 0.03 to 0.2 gf/dtex, preferably about 0.05 to 0.15 gf/dtex, and more preferably about 0.08 to 0.1 gf/dtex.

The tension applied to the primary twisted yarn S (tension per dtex) can be selected from a range of about 1.1 to 10 times the tension applied to the primary twisted yarn L, and is, for example, about 1.3 to 6 times, preferably about 1.5 to 5 times, more preferably about 2 to 4 times, and most preferably about 2.5 to 3 times the tension applied to the primary twisted yarn L. When the tension on the primary twisted yarn S is too low, there is a concern that the length of the primary twisted yarn S after being untwisted cannot be made sufficiently smaller than the length of the primary twisted yarn L, and the elongation of the twisted cord during the production of the belt is insufficient. Conversely, when the tension on the primary twisted yarn S is too high, the alignment of the primary twisted yarns may be excessively deteriorated, and the tensile strength may decrease.

The twisted cord of the present invention is used for constituting a core wire of a power-transmission belt, and the twisted cord obtained by secondary twist under the tension described above may be further subjected to an adhesion treatment. Examples of such an adhesion treatment include a method of immersing the twisted cord into a treatment liquid containing an epoxy compound or a polyisocyanate compound, a method of immersing the twisted cord into an RFL treatment liquid containing resorcin, formaldehyde, and latex, a method of immersing the twisted cord into a mucilage, and a method of immersing the twisted cord into an overcoat treatment liquid containing a polyolefin-based adhesive. These treatments may be applied alone or in combination of two or more kinds. As a method other than immersion, a method of spraying or applying a treatment liquid may be used. However immersion is preferred in view of easily permeating the adhesive component into the core wire and easily making the thickness of the adhesive layer uniform. Among these methods, a method of treating the twisted cord by combining the method of immersing the twisted cord into a treatment liquid containing a polyisocyanate compound, the method of immersing the twisted cord into an RFL treatment liquid, and the method of immersing the twisted cord into an overcoat treatment liquid in this order is preferable.

In the method of immersing the twisted cord into the treatment liquid containing a polyisocyanate compound, examples of the polyisocyanate compound include polyisocyanates or derivatives thereof such as aliphatic polyisocyanates or derivatives thereof (e.g., HDI or trimers thereof) and aromatic polyisocyanates (TDI, MDI, etc.), and urethane oligomers having a plurality of isocyanate groups. Examples of the derivatives include multimers (dimers, trimers, tetramers, etc.), adducts, and modified products (biuret modified products, alohanate modified products, urea modified products, etc.). The proportion of the polyisocyanate compound adhering to the twisted cord by the immersion treatment is, for example, 0.1 to 30 parts by mass, preferably 1 to 20 parts by mass, and more preferably 3 to 15 parts by mass with respect to 100 parts by mass of the twisted cord.

In the method of immersing the twisted cord into the RFL treatment liquid, the latex is preferably a diene rubber such as acrylonitrile butadiene rubber (nitrile rubber). The total proportion of resorcin, formaldehyde, and latex adhering to the twisted cord by the immersion treatment is, for example, 0.1 to 30 parts by mass, preferably 1 to 20 parts by mass, and more preferably 3 to 15 parts by mass with respect to 100 parts by mass of the twisted cord.

In the method of immersing the twisted cord into the overcoat treatment liquid containing the polyolefin-based adhesive, examples of the polyolefin-based adhesive include an ethylene-vinyl acetate copolymer and an ethylene-(meth) acrylic acid copolymer. The proportion of the polyolefin-based adhesive adhering to the twisted cord by the immersion treatment is, for example, 0.1 to 30 parts by mass, preferably 1 to 20 parts by mass, and more preferably 3 to 15 parts by mass with respect to 100 parts by mass of the twisted cord.

In particular, heat treatment may be performed for drying or curing after causing various adhesive components to adhere in the adhesion treatment. In particular, it is preferable to perform heat treatment for thermal stretching and fixing after the twisted cord is treated with the RFL treatment liquid. The heat set stretching rate during the heat treatment may be about 0 to 3%, preferably about 0.1 to 2.5%, and more preferably about 0.5 to 2%. In the present invention, since the elongation allowance during vulcanization can be ensured by reducing the heat set stretching rate, a rib shape can be stably formed, and disturbance of the pitch of the core wire and damage can be prevented.

In the present application, the heat set stretching rate can be obtained from the following equation by measuring the velocity of the core wires at an inlet and an outlet of a heat treatment furnace.

Heat set stretching rate (%) = {(velocity of core wire at outlet of heat treatment furnace − velocity of core wire at inlet of heat treatment furnace)/velocity of core wire at inlet of heat treatment furnace} × 100.

Power-transmission Belt

Examples of the power-transmission belt of the present invention include a V-belt such as a wrapped V-belt and a raw edge V-belt, a V-ribbed belt, a flat belt, a toothed belt, and the like. Among these power-transmission belts, a V-ribbed belt, which is produced by a mold forming method and requires elongation during the production of the belt, is preferred.

Figure 4:
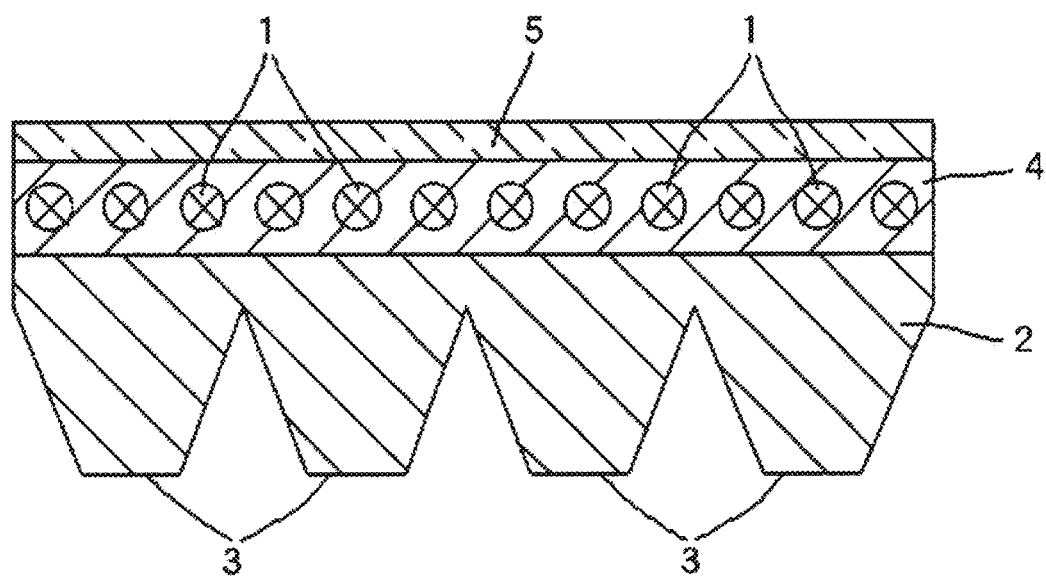
FIG. 4 is a schematic cross-sectional view illustrating an example of a V-ribbed belt of the present invention.

The form of the power-transmission belt (V-ribbed belt) of the present invention is not particularly limited as long as it includes a plurality of V-rib portions extending parallel to each other along the longitudinal direction of the belt, and for example, the form shown in FIG. 4 is exemplified. FIG. 4 is a schematic cross-sectional view illustrating an example of a V-ribbed belt of the present invention. The V-ribbed belt illustrated in FIG. 4 has a form in which a compression rubber layer 2 (first rubber layer), an adhesive rubber layer 4 (second rubber layer) in which a core wire 1 is embedded in the longitudinal direction of the belt, and a tension layer 5 formed of a cover canvas (woven fabric, knitted fabric, nonwoven fabric, etc.) or a rubber composition are laminated in this order from a lower surface (inner peripheral surface) of the belt toward an upper surface (back surface) of the belt. A plurality of sectionally V-shaped grooves extending in the longitudinal direction of the belt are formed in the compression rubber layer 2. A plurality (four in the example illustrated in FIG. 4) of V-rib portions 3 each having a V-shape in section (i.e., inverted trapezoid shape) are formed between the grooves. Two slopes (i.e., surfaces) of each V-rib portion 3 form a frictional power transmission face, which comes into contact with a pulley to transmit power (i.e., frictional power transmission).

The form of the V-ribbed belt of the present invention is not limited to this form. Any V-ribbed belt can be used as long as it includes a compression rubber layer having a power-transmission face at least a part of which can be in contact with a V-rib groove portion (V-groove portion) of a pulley. Generally, the V-ribbed belt includes a tension layer, a compression rubber layer, and core wires embedded therebetween along the longitudinal direction of the belt. In the V-ribbed belt of the present invention, for example, the core wire 1 may be embedded between the tension layer 5 and the compression rubber layer 2 without providing the adhesive rubber layer 4. Further, the V-ribbed belt may have a form in which the adhesive rubber layer 4 may be provided on either of the compression rubber layer 2 or the tension layer 5, and the core wire 1 may be embedded between the adhesive rubber layer 4 (compression rubber layer 2 side) and the tension layer 5, or between the adhesive rubber layer 4 (tension layer 5 side) and the compression rubber layer 2.

Any compression rubber layer 2 can be used as long as it includes a rubber composition described later in detail, any adhesive rubber layer 4 can be used as long as it includes a rubber composition that is commonly used as an adhesive rubber layer, and any tension layer 5 can be used as long as it includes a cover canvas or a rubber composition that is commonly used as a tension layer. The tension layer 5 does not have to include the same rubber composition as the compression rubber layer 2.

In particular, since the V-ribbed belt of the present invention is excellent in noise suppression and durability even in applications in which high dynamic tension is generated, the V-ribbed belt is preferably a V-ribbed belt that is widely used in applications in which high dynamic tension is generated. An example of such a V-ribbed belt is a V-ribbed belt in which at least a part of a surface (inner peripheral surface) of the compression rubber layer is covered with cloth. The cloth covers at least a part of the surface of the compression rubber layer, but generally covers the entire surface of the compression rubber layer.

Core Wire

The plurality of core wires are embedded in the rubber layer of the power-transmission belt, and in this example, the plurality of core wires 1 each extend in the longitudinal direction of the belt and are arranged to be separated from each other at a predetermined pitch in the width direction of the belt in the adhesive rubber layer 4.

The average pitch of the core wires (the average distance between the centers of the adjacent core wires) can be appropriately selected in accordance with the core wire diameter and the target belt tensile strength, and is, for example, about 0.6 to 2 mm, preferably about 0.8 to 1.5 mm, and more preferably about 0.9 to 1.05 mm. When the average pitch of the core wires is too small, the core wires may run onto each other in the belt manufacturing steps, and conversely, when the average pitch is too large, the tensile strength and the tensile elastic modulus of the belt may decrease. The average pitch of the core wires is a value obtained by measuring a distance between centers of adjacent core wires at 10 points in a cross section in the width direction of the V-ribbed belt and averaging the measured distances. The distance between the centers of the core wires can be measured using a known device such as a scanning electron microscope (SEM) and a projector.

The core wire may be either S-twist or Z-twist, but it is preferable to alternately arrange the S-twist and the Z-twist in order to improve straightness of the belt. The core wire may be covered with a rubber composition containing a rubber component constituting the adhesive rubber layer, in addition to the adhesion treatment described above.

Rubber Composition

The compression rubber layer 2, the adhesive rubber layer 4, and the tension layer 5 may be formed of a rubber composition containing a rubber component. As the rubber component, vulcanizable or crosslinkable rubber may be used, and examples thereof include diene rubbers (a natural rubber, an isoprene rubber, a butadiene rubber, a chloroprene rubber, a styrene-butadiene rubber (SBR), an acrylonitrile butadiene rubber (nitrite rubber), a hydrogenated nitrile rubber, etc.), an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, and a fluorine rubber. These rubber components can be used alone or in combination of two or more kinds thereof. The ethylene-α-olefin elastomer (ethylene-propylene copolymer (EPM), ethylene-propylene-diene terpolymer (EPDM), etc.) and the chloroprene rubber are preferred rubber components. Further, the ethylene-α-olefin elastomer (ethylene-propylene copolymer (EPM) and the ethylene-propylene-diene terpolymer (EPDM), etc.) are particularly preferred in view of having ozone resistance, heat resistance, cold resistance and weather resistance and reducing the weight of the belt. When the rubber component contains the ethylene-α-olefin elastomer, the proportion of the ethylene-α-olefin elastomer in the rubber component may be 50 mass % or more (particularly about 80 to 100 mass %), and is particularly preferably 100 mass % (only the ethylene-α-olefin elastomer).

The rubber composition may further contain staple fibers. Examples of the staple fiber include: a synthetic fiber such as a polyolefin fiber (a polyethylene fiber, a polypropylene fiber, etc.), a polyamide fiber (a polyamide-6 fiber, a polyamide-66 fiber, a polyamide-46 fiber, an aramid fiber, etc.), a polyalkylene arylate fiber (a $C_{2-4}$ alkylene $C_{8-14}$ arylate fiber such as a polyethylene terephthalate (PET) fiber, a polytrimethylene terephthalate (PTT) fiber, a polybutylene terephthalate (PBT) fiber, and a polyethylene naphthalate (PEN) fiber, etc.), a vinylon fiber, a polyvinyl alcohol fiber, and a polyparaphenylene benzobisoxazole (PBO) fiber; a natural fiber such as cotton, hemp, and wool; and an inorganic fiber such as a carbon fiber. These staple fibers may be used alone or in combination of two or more kinds. The staple fiber may be subjected to an adhesion treatment (or surface treatment) used commonly, in the same manner as the core wire, in order to improve dispersibility and adhesive property in the rubber composition.

The rubber composition may further include additives used commonly. Examples of the additives used commonly include a vulcanizing agent or a cross-linking agent (or a cross-linking agent based additive) (a sulfur-based vulcanizing agent, etc.), a co-cross-linking agent (bismaleimides, etc.), a vulcanization aid or a vulcanization accelerator (a thiuram-based accelerator, etc.), a vulcanization retarder, a metal oxide (zinc oxide, magnesium oxide, calcium oxide, barium oxide, iron oxide, copper oxide, titanium oxide, aluminum oxide, etc.), a reinforcing agent (e.g., carbon black, or silicon oxide such as hydrous silica), a filler (clay, calcium carbonate, talc, mica, etc.), a softener oils such as paraffin oil and naphthenic oil), a processing agent or a processing aid (stearic acid, metal stearate, wax, paraffin, fatty acid amide, etc.), an anti-aging agent (an antioxidant, an anti-heat aging agent, a bending-crack inhibitor, an ozone-deterioration inhibitor, etc.), a coloring agent, a tackifier, a plasticizer, a coupling agent (a silane coupling agent, etc.), a stabilizer (an ultraviolet absorber, a heat stabilizer, etc.), a flame retardant, and an antistatic agent. These additives may be used alone or in combination of two or more kinds. The metal oxide may act as a crosslinking agent. In particular, the rubber composition constituting the adhesive rubber layer 4 may contain an adhesion improver (resorcin-formaldehyde co-condensate, amino resin, etc.).

The rubber compositions constituting the compression rubber layer 2, the adhesive rubber layer 4, and the tension layer 5 may be the same as one another or may be different from one another. Similarly, the staple fibers contained in the compression rubber layer 2, the adhesive rubber layer 4, and the tension layer 5 may be the same as one another or may be different from one another.

Cover Canvas

The tension layer 5 may be formed of a cover canvas. The cover canvas can be formed of, for example, a fabric material (preferably, a woven fabric) such as a woven fabric, a wide angle canvas, a knitted fabric, or a nonwoven fabric. If necessary, after performing an adhesion treatment such as a treatment with an RFL treatment liquid (such as immersion treatment), friction of rubbing adhesive rubber into the fabric material, or laminating (coating) of the adhesion rubber and the fabric material, the cover canvas may be laminated on the compression rubber layer and/or the adhesive rubber layer in the above form.

Cloth Covering Surface of Compression Rubber Layer

As the cloth that covers at least a part of the surface (inner peripheral surface) of the compression rubber layer, the fabric material exemplified for the cover canvas can be used, and the adhesion treatment may be performed in the same manner as the cover canvas. Among the fabric materials, the cloth that covers the frictional power transmission face is preferably a knitted fabric in view of excellent durability and tension ability. The material of the knitted fabric is not particularly limited, and examples thereof include low-modulus fibers and fibers exemplified as staple fibers blended in a belt. The knitted fabric may be a knitted fabric of a cellulose-based fiber (e.g., cotton yarn) and a polyester-based fiber (a PTT/PET conjugate fiber or the like).

Method of Producing Power-transmission Belt

As a method of producing the power-transmission belt of the present invention, a method of producing a power-transmission belt which is commonly used can be used as long as the twisted cord for the core wire obtained by the method described above is used. The V-ribbed belt may be produced, for example, by the following production method.

As a first production method, a method of obtaining a vulcanized sleeve with a ribbed surface can be exemplified. The method includes: a step of forming an unvulcanized sleeve in which an unvulcanized tension rubber sheet, a twisted cord for a core wire, and an unvulcanized compression rubber sheet are arranged in this order from an inner peripheral side on an inner mold equipped with a flexible jacket; and a step of pressing the unvulcanized sleeve from an inner peripheral side onto an outer mold having a rib-shaped engraving by allowing the flexible jacket to expand and vulcanizing the unvulcanized sleeve.

As a second production method, a method of obtaining a vulcanized sleeve with a ribbed surface can be exemplified. The method includes: a step of forming a first unvulcanized sleeve in which an unvulcanized compression rubber sheet is arranged on an inner mold equipped with a flexible jacket; a step of forming a pre-molded body with a rib shape engraved on a surface by pressing the first unvulcanized sleeve from an inner peripheral side onto an outer mold having a rib-shaped engraving by allowing the flexible jacket to expand; a step of forming a second unvulcanized sleeve by arranging an unvulcanized tension rubber sheet and a core wire in this order on the inner mold equipped with the flexible jacket after the inner mold equipped with the flexible jacket is separated from the outer mold that is in close contact with the pre-molded body by releasing the expansion of the flexible jacket; and a step of pressing the second unvulcanized sleeve from the inner peripheral side onto the outer mold that is in close contact with the pre-molded body to vulcanize integrally with the pre-molded body by allowing the flexible jacket to expand again.

When the surface (inner peripheral surface) of the compression rubber layer is covered with cloth, cloth may be provided on the outermost layer (outer peripheral side) of the unvulcanized sleeve to be in contact with the outer mold. An adhesive rubber sheet may be provided between the core wire and the tension rubber sheet and/or between the core wire and the compression rubber sheet.

Among these methods, the first production method has a simple step and is excellent in the productivity. The second production method can reduce the expansion rate of the core wire by reducing the interval between the inner mold and the outer mold, so that damage to the core wire can be prevented, and a decrease in the durability of the belt can be prevented. Although the production method can be selected depending on the priority item of the productivity and the durability, it is preferable to apply the first production method in view of the object of the present invention.

EXAMPLE

The present invention will be described below in detail based on examples. However, the present invention is not limited by the examples. The details of the raw materials used in Examples and the evaluation methods of the measured evaluation items are shown below.

Raw Material

Twisted Cord

Aramid 1: "Twaron (registered trademark)" manufactured by Teijin Limited, tensile elastic modulus: 60 GPa
Aramid 2: "Twaron (registered trademark)" manufactured by Teijin Limited, tensile elastic modulus: 80 GPa Aliphatic polyamide: "Leona (registered trademark) nylon 66" manufactured by Asahi. Kasei Corporation, tensile elastic modulus: 3.8 GPa.

Adhesion Treatment Liquid

Polymeric MDI: "Millionate (registered trademark) MR-200" manufactured by Tosoh Corporation, NCO content: 30%
NBR latex: "Nipol (registered trademark) 1562" manufactured by Zeon Corporation, total solid content: 41%, medium-high nitrile type
Polyolefin-based adhesive: "Chemlok (registered trademark) 233X" manufactured by Lord Corporation, total solid content: 27%.

Belt

EPDM: "NORDEL (registered trademark) IP3640" manufactured by Dow Chemical Japan Ltd., ethylene content: 55%, ethylidene norbornene content: 1.8%
Carbon black HAF: "SEAST (registered trademark) 3" manufactured by Tokai Carbon Co., Ltd.
Paraffinic oil: "Diana (registered trademark) process oil" manufactured by Idemitsu Kosan Co. Ltd.
Anti-aging agent: "Nonflex (registered trademark) OD3" manufactured by Seiko Chemical Co., Ltd.
Organic peroxide: "Perkadox (registered trademark) 14RP" manufactured by Kayaku Akzo Co., Ltd.
Nylon staple fiber: "Nylon 66" manufactured by Asahi Kasei Corporation, fiber length: about 0.5 mm
Knitted fabric: weft knitted fabric of cotton yarn and PTT/PET conjugate yarn Measurement of Difference in Length of Primary Twisted Yarn The difference in length of the primary twisted yarns was measured by the following procedure.
1) The distance between chucks of a twisting inspection machine is set to 25 cm, and the twisted cord is chucked.
2) The secondary twist is untwisted, and the length of the primary twisted yarn S (yarn extending linearly) at that time is measured (at this time, the primary twisted yarn L being in a loosened state).
3) The length of the primary twisted yarn L is measured by cutting the other primary twisted yarns including the primary twisted yarn S while leaving the primary twisted yarn L, and stretching the primary twisted yarn L iii a straight line from a loosened state.
4) The length of the primary twisted yarn S is subtracted from the length of the primary twisted yarn L.

Elongation at 100 N

The elongation at 100 N was measured according to JIS L2017 (2002). Specifically, a core wire alone (a prepared adhesion-treated cord) was set in a pair of grabbing tools of an autograph so that the core wire was straight without being slackened. The grabbing interval at this time was set to $L_0$ (about 250 mm). Next, one of the grabbing tools was moved at a speed of 300 mm/min to apply a tensile load to the cord, and the tensile load and the grabbing interval were recorded. The elongation at 100 N was determined by the following formula while regarding the grabbing interval at the time when the tensile load reached 100 N as $L_1$ (mm).

$$\text{Elongation at } 100\ N\ (\%) = ((L_1 - L_0)/L_0) \times 100$$

Tensile Strength of Adhesion-treated Cord

In the measurement test of the elongation at 100 N, a tensile load was applied to the cord until the cord was cut, and the maximum value of the tensile load recorded when the cord was cut was defined as the tensile strength.

Tensile Strength of Belt

The V-ribbed belt (rib number: 3) was pulled using a universal testing machine ("UH-200 kNX" manufactured by Shimadzu Corporation) under the conditions of a tensile speed of 50 mm/min and a test temperature of 23° C., and the strength of the V-ribbed belt at break was measured. The measured strength of the V-ribbed belt at break was divided by 3 and converted into a value per rib, which was defined as the tensile strength of the belt.

Durability Running Test (Tensile Strength Retention Rate) of Belt

Figure 5:
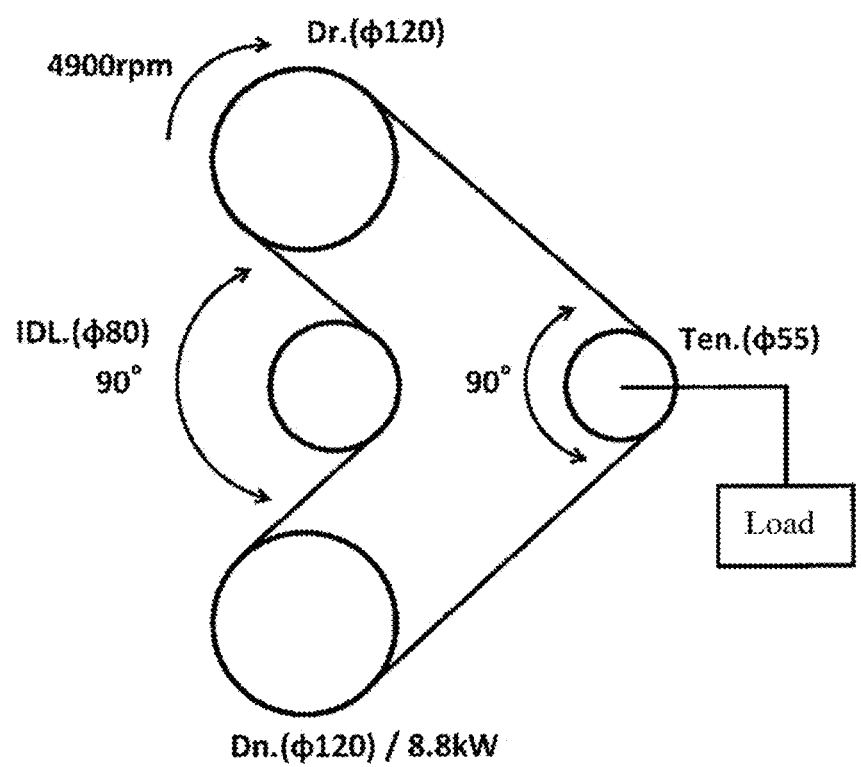
FIG. 5 is a schematic view illustrating a layout of a testing machine used in a belt durability running test in Examples.

A durability running test of a belt was performed using a testing machine having a layout shown in FIG. 5 in which a driving pulley (Dr.) having a diameter of 120 mm, a tension pulley (Ten.) having a diameter of 55 mm, a driven pulley (Dn.) having a diameter of 120 mm, and an idler pulley (IDL.) having a diameter of 80 mm were arranged in this order. A V-ribbed belt was wound around each pulley of the testing machine under conditions that a rotational frequency of the driving pulley was set to 4900 rpm, a winding angle of the belt around the idler pulley was set to 90°, a winding angle of the belt around the tension pulley was set to 90°, and a load of the driven pulley was set to 8.8 kW, and then a constant load (about 560 N) was applied to the belt such that the belt tension was 395 N, and the belt ran at an atmospheric temperature of 100° C. for 400 hours at the maximum. The tensile strength (residual strength) of the belt after the durability running test was measured, and the tensile strength retention rate of the belt was calculated from the value of the tensile strength of the belt before the durability running test measured in advance.

Tensile strength retention rate (%) of belt = (Tensile strength of belt after durability running test/Tensile of belt before durability running test) × 100.

Presence or Absence of Voids (Pores) in Belt

The resulting V-ribbed belt was cut parallel to the width direction, and the cross section thereof was enlarged 20 times with a microscope to confirm the presence or absence of a void between the core wire and the compression rubber.

Example 1

Preparation of Twisted Cord

As shown in Table 5, three primary twisted yarns L obtained by primarily twisting a bundle of fibers of 1100 dtex aramid 1 in the Z direction at a twist coefficient of 1.5 and one primary twisted yarn S obtained by primarily twisting a bundle of fibers of 940 dtex aliphatic polyamide in the same Z direction as that of the aramid fibers at a twist coefficient of 0.5 were collected. The tension of 100 gf and 125 gf were applied to the primary twisted yarns L and S, respectively, and the primary twisted yarns L and S were secondarily-twisted at a twist coefficient of 3 in the same Z direction as that of the primary twist, thereby preparing a twisted cord of a Lang lay.

Adhesion Treatment of Cord

First, the prepared twisted cord was immersed into a treatment liquid (25° C.) containing an isocyanate compound shown in Table 1 for 5 seconds, and then dried at 150° C. for 2 minutes (pre-dip treatment step). Next, the twisted cord after the pre-dip treatment was immersed into an RFL treatment liquid (25° C.) shown in Table 2 for 5 seconds, and then subjected to a heat treatment at 200° C. for 2 minutes (RFL treatment step). During the heat treatment, the twisted cord was thermally stretched and fixed at a heat set stretching rate of 0% to 3%. Further, the twisted cord after the RFL treatment was immersed into a treatment liquid (solid content concentration: 7%, 25° C.) containing an adhesive component shown in Table 3 for 5 seconds, and then dried at 160° C. for 4 minutes (overcoat treatment step) to obtain an adhesion-treated cord.

TABLE 1

(Pre-dip treatment liquid)

| Mixed chemicals | Parts by mass |
| --- | --- |
| Polymeric MD I | 10 |
| Toluene | 100 |
| Total | 110 |

TABLE 2

(RFL treatment liquid)

| Mixed chemicals | Parts by mass |
| --- | --- |
| NBR latex | 289.6 |
| Resorcin | 30 |
| 37% formalin | 18.6 |
| Water | 515 |
| Polymeric MD I | 37 |
| Total | 890.2 |

TABLE 3

(Overcoat treatment liquid)

| Mixed chemicals | Parts by mass |
| --- | --- |
| Polyolefin-based adhesive | 18 |
| Toluene | 51.2 |
| Total | 69.2 |

Production of Belt

A vulcanized sleeve with a ribbed surface was obtained through the following steps: a step of forming a first unvulcanized sleeve in which an unvulcanized compression rubber sheet having the composition shown in Table 4 and a knitted fabric are arranged in this order from an inner peripheral side on an inner mold equipped with a flexible jacket; a step of forming a pre-molded body with a rib shape engraved on a surface by pressing the first unvulcanized sleeve from the inner peripheral side onto an outer mold having a rib-shaped engraving by allowing the flexible jacket to expand; a step of forming a second unvulcanized sleeve by arranging an unvulcanized tension rubber sheet having a composition shown in Table 4 and an adhesion-treated cord in this order on the inner mold equipped with the flexible jacket after the inner mold equipped with the flexible jacket is separated from the outer mold that is in close contact with the pre-molded body by releasing the expansion of the flexible jacket; and a step of pressing the second unvulcanized sleeve from the inner peripheral side onto the outer mold that is in close contact with the pre-molded body to vulcanize integrally with the pre-molded body by allowing the flexible jacket to expand again. The vulcanized sleeve was cut in parallel with a peripheral direction by a cutter to obtain a V-ribbed belt (belt size: 3PK1100, rib shape: K, number of ribs: 3, circumferential length: 1100 mm).

TABLE 4

(Rubber composition)

| Materials | Compression rubber | Tension rubber |
| --- | --- | --- |
| EPDM | 100 | 100 |
| Zinc oxide | 5 | 5 |
| Stearic acid | 1 | 1 |
| Carbon black HAF | 80 | 80 |
| Paraffin oil | 15 | 15 |
| Anti-aging agent | 2 | 2 |
| Organic peroxide | 5 | 5 |
| Nylon staple fiber | 0 | 15 |
| Total | 208 | 223 |

Example 2

A V-ribbed belt was produced in the same manner as in Example 1 except that the tension applied in the secondary twist to the primary twisted yarn S formed of an aliphatic polyamide was changed to 200 gf in the preparation of the twisted cord.

Example 3

A V-ribbed belt was produced in the same manner as in Example 1 except that the tension applied in the secondary twist to the primary twisted yarn S formed of an aliphatic polyamide was changed to 250 gf in the preparation of the twisted cord.

Example 4

A V-ribbed belt was produced in the same manner as in Example 1 except that the tension applied in the secondary twist to the primary twisted yarn S formed of an aliphatic polyamide was changed to 400 gf in the preparation of the twisted cord.

Example 5

A V-ribbed belt was produced in the same manner as in Example 3 except that aramid 2 was used as the primary twisted yarn L in the preparation of the twisted cord.

Example 6

A V-ribbed belt was produced in the same manner as in Example 4 except that aramid 2 was used as the primary twisted yarn L and the twist coefficient of the primary twist was changed to 2.0 in the preparation of the twisted cord.

Example 7

A V-ribbed belt was produced in the same manner as in Example 6 except that the twist coefficient of the primary twisted yarn L was changed to 3.0 in the preparation of the twisted cord.

Example 8

A V-ribbed belt was produced in the same manner as in Example 5 except that the twist coefficient of the primary twisted yarn L was changed to 0.5 in the preparation of the twisted cord.

Example 9

A V-ribbed belt was produced in the same manner as in Example 5 except that one primary twisted yarn obtained by primarily twisting a bundle of fibers of 3340 dtex aramid-2 in the Z direction at a twist coefficient of 1.5 was used as the primary twisted yarn L in the preparation of the twisted cord.

Example 10

A V-ribbed belt was produced in the same manner as in Example 5 except that two primary twisted yarns obtained by primarily twisting a bundle of fibers of 1670 dtex aramid-2 in the Z direction at a twist coefficient of 1.5 were used as the primary twisted yarn L in the preparation of the twisted cord.

Example 11

A V-ribbed belt was produced in the same manner as in Example 5 except that a twisted cord of plied twist was prepared by performing secondary twist in the S direction, which is the opposite direction to the primary twist, in the preparation of the twisted cord.

Comparative Example 1

A V-ribbed belt was produced in the same manner as in Example 1 except that the tension applied in the secondary twist to an aliphatic polyamide, which is the primary twisted yarn S, was changed to 100 gf in the preparation of the twisted cord.

Comparative Example 2

A V-ribbed belt was produced in the same manner as in Example 1 except that the tension applied in the secondary twist to an aliphatic polyamide, which is the primary twisted yarn S, was changed to 600 gf in the preparation of the twisted cord.

Comparative Example 3

A V-ribbed belt was produced in the same manner as in Example 6 except that the twist coefficient of the primary twisted yarn L was changed to 4.0 in the preparation of the twisted cord.

The evaluation results of the adhesion-treated cords and the V-ribbed belts obtained in Examples 1 to 11 and Comparative Examples 1 to 3 are shown in Tables 5 and 6.

TABLE 5

| | | | Examples | | | | | | |
|---|---|---|---|---|---|---|---|---|---|
| | | | 1 | 2 | 3 | 4 | 5 | 6 | 7 |
| Cord configuration | Primary twisted yarn L | Aramid 1 | 1100T/1 × 3 | 1100T/1 × 3 | 1100T/1 × 3 | 1100T/1 × 3 | — | — | — |
| | | Aramid 2 | — | — | — | — | 1100T/1 × 3 | 1100T/1 × 3 | 1100T/1 × 3 |
| | Primary twisted yarn S | Aliphatic polyamide | 940T/1 | 940T/1 | 940T/1 | 940T/1 | 940T/1 | 940T/1 | 940T/1 |
| Twist coefficient | Aramid (Primary twist) | | 1.5 | 1.5 | 1.5 | 1.5 | 1.5 | 2.0 | 3.0 |
| | Aliphatic polyamide (Primary twist) | | 0.5 | 0.5 | 0.5 | 0.5 | 0.5 | 0.5 | 0.5 |
| | Secondary twist | | 3.0 | 3.0 | 3.0 | 3.0 | 3.0 | 3.0 | 3.0 |
| | Twist configuration | | Lang lay | Lang lay | Lang lay | Lang lay | Lang lay | Lang lay | Lang lay |
| Tension (gf) of primary twisted yarn during secondary twist | | Aramid | 100 | 100 | 100 | 100 | 100 | 100 | 100 |
| | | Aliphatic polyamide | 125 | 200 | 250 | 400 | 250 | 400 | 400 |
| Difference in length between primary twisted yarns (mm) | | | 1.2 | 2.3 | 3.5 | 7.3 | 3.0 | 6.5 | 8.2 |
| Adhesion-treated cord | Elongation at 100N (%) | | 1.01 | 1.05 | 1.12 | 1.26 | 1.03 | 1.12 | 1.29 |
| | Tensile strength (N) | | 621 | 622 | 615 | 588 | 610 | 599 | 578 |
| Belt | Tensile strength (kN/rib) | | 2.0 | 2.0 | 2.0 | 1.9 | 2.0 | 1.9 | 1.8 |
| | Tensile strength retention rate (%) | | 77 | 76 | 75 | 75 | 76 | 75 | 74 |
| | Presence or absence of voids | | Absent | Absent | Absent | Absent | Absent | Absent | Absent |

TABLE 6

| | | | Examples | | | | Comparative Examples | | |
|---|---|---|---|---|---|---|---|---|---|
| | | | 8 | 9 | 10 | 11 | 1 | 2 | 3 |
| Cord configuration | Primary twisted yarn L | Aramid 1 | — | — | — | — | 1100T/1 × 3 | 1100T/1 × 3 | — |
| | | Aramid 2 | 1100T/1 × 3 | 3340T/1 | 1670T/1 × 2 | 1100T/1 × 3 | — | — | 1100T/1 × 3 |
| | Primary twisted yarn S | Aliphatic polyamide | 940T/1 | 940T/1 | 940T/1 | 940T/1 | 940T/1 | 940T/1 | 940T/1 |
| Twist coefficient | Aramid (Primary twist) | | 0.5 | 1.5 | 1.5 | 1.5 | 1.5 | 1.5 | 4.0 |
| | Aliphatic polyamide (Primary twist) | | 0.5 | 0.5 | 0.5 | 0.5 | 0.5 | 0.5 | 0.5 |
| | Secondary twist | | 3.0 | 3.0 | 3.0 | 3.0 | 3.0 | 3.0 | 3.0 |
| | Twist configuration | | Lang lay | Lang lay | Lang lay | plied twist | Lang lay | Lang lay | Lang lay |
| Tension (gf) of primary twisted yarn during secondary twist | | Aramid | 100 | 100 | 100 | 100 | 100 | 100 | 100 |
| | | Aliphatic polyamide | 250 | 250 | 250 | 250 | 100 | 600 | 400 |
| Difference in length between primary twisted yarns (mm) | | | 3.3 | 3.5 | 3.4 | 3.1 | 0.8 | 11.3 | 10.1 |
| Adhesion-treated cord | Elongation at 100N (%) | | 1.02 | 1.21 | 1.12 | 1.16 | 0.95 | 1.35 | 1.37 |
| | Tensile strength (N) | | 574 | 562 | 592 | 683 | 615 | 542 | 525 |
| Belt | Tensile strength (kN/rib) | | 1.8 | 1.8 | 1.9 | 2.2 | 2.0 | 1.7 | 1.6 |
| | Tensile strength retention rate (%) | | 72 | 66 | 71 | 66 | 58 | —(break) | —(break) |
| | Presence or absence of voids | | Absent | Absent | Absent | Absent | Present | Absent | Absent |

In Examples 1 to 11, the elongation of the adhesion-treated cord at 100 N was as high as 1% or more, and the tensile strength was also high, which were good results. In addition, the tensile strength of the belt was high, the durability was excellent, and voids were not generated.

Specifically, in Examples 1 to 4, the tension applied in the secondary twist to the primary twisted yarn S formed of an aliphatic polyamide was increased, so that the elongation of the adhesion-treated cord at 100 N was increased, but there was a tendency that the tensile strength decreases. However, the characteristics of the belt were equivalent in all of Examples 1 to 4. Among these, Example 3 was excellent in balance of various characteristics.

Example 5 was an example in which the type of aramid in Example 3 was changed, and the elongation of the adhesion-treated cord at 100 N slightly decreased. In Examples 6 and 7 and Comparative Example 3, the twist coefficient of the primary twisted yarn L formed of the aramid 2 in Example 5 was increased, and the elongation of the adhesion-treated cord at 100 N increased, but there was a tendency that the tensile strength decreases. The durability of the belt was excellent In Examples 5 to 7, whereas in Comparative Example 3 in which the twist coefficient was 4.0, the belt was broken in the durability running test.

Example 8 is an example in which the twist coefficient of the primary twisted yarn L in Example 5 was changed to 0.5 to be same as the primary twist coefficient of the primary twisted yarn S. As compared with Example 5, the tensile strength of the adhesion-treated cord decreased, and the tensile strength and the tensile strength retention rate of the belt also decreased, but Example 8 was at a practically acceptable level. From the comparison between Example 5 and Example 8, it was found that the primary twist coefficient of the primary twisted yarn formed of aramid was preferably larger than the primary twist coefficient of the primary twisted yarn formed of the aliphatic polyamide.

Examples 9 and 10 are examples in which the number of the primary twisted yarns L in Example 5 was changed to one or two without changing the total fineness. From the results of Examples 5, 9, and 10, when the number of the primary twisted yarns L increased, there was a tendency that the tensile strength of the adhesion-treated cord increases and the elongation at 100 N decreases. It is considered that the positional relationship between the primary twisted yarn L and the primary twisted yarn S is changed due to the change in the number of the primary twisted yarns L, and thus the tensile characteristics are changed. It was found that the tensile strength retention rate of the belt was highest in Example 5 in which the number of the primary twisted yarns formed of aramid was large, and the number of the primary twisted yarns formed of aramid was preferably large.

Example 11 was the same as Example 5 except that the twist configuration was plied twist, and the tensile strength of the belt was increased, but the tensile strength retention rate decreased probably because the bending fatigue resistance decreased. From this result, it was found that the Lang lay is preferred as the twist configuration.

In Comparative Example 1, since the tension of the primary twisted yarn S during secondary twist was the same as that of the primary twisted yarn L, the elongation of the adhesion-treated cord at 100 N was reduced, and voids were generated in the belt. It is considered that the voids were generated because the elongation of the core wire was not sufficient, the force pressing the compression layer was insufficient, and the air did not escape. Further, from the results of Comparative Example 1, it is shown that when the elongation of the adhesion-treated cord at 100 N is 0.95% or less, voids are likely to generate in the belt. As for the reduction of the tensile strength of the belt, it can be estimated that, when the voids are generated, the adhesive force between the core wire and the compression layer decreases and thus the durability of the belt decreases.

In Comparative Example 2, since the tension of the primary twisted yarn S during secondary twist was too high, the alignment of the primary twisted yarns was excessively deteriorated (the difference in length between the aramid primary twisted yarn and the nylon primary twisted yarn was too large), and the tensile strength decreased. As a result, the durability of the belt also decreased, and the belt was broken in the durability running test.

Figure 6:
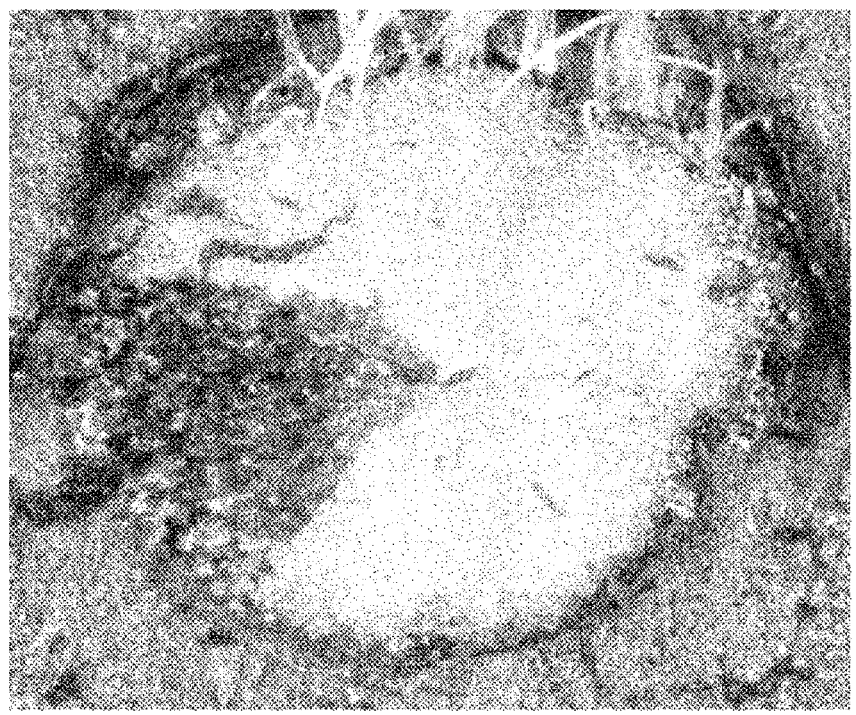
FIG. 6 is a cross-sectional photograph of a twisted cord obtained in Example 3.
Figure 7:
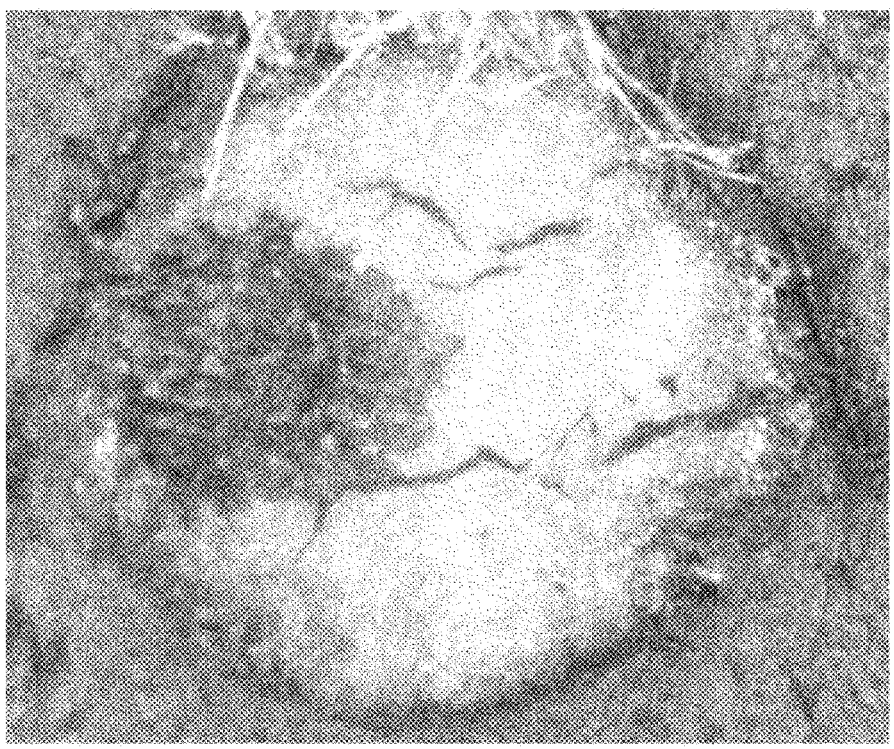
FIG. 7 is a cross-sectional photograph of a twisted cord obtained in Example 4.
Figure 8:
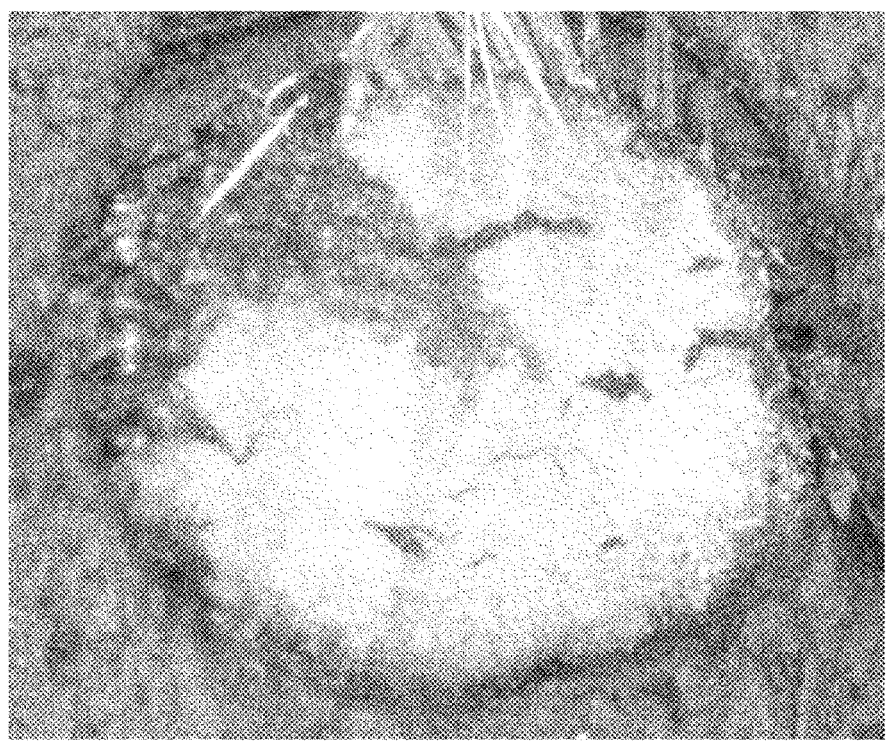
FIG. 8 is a cross-sectional photograph of a twisted cord obtained in Comparative Example 1.

Cross-sectional photographs of the twisted cords obtained in Examples 3 and 4 and Comparative Example 1 are shown in FIGS. 6 to 8, respectively. As apparent from these photographs, it can be observed that the primary twisted yarn S indicated by the black portion occupies the vicinity of the center of the cross section as the tension of the primary twisted yarn S during the secondary twist increases, and in Comparative Example 1, the primary twisted yarn S is pushed out to the circumferential portion.

INDUSTRIAL APPLICABILITY

The twisted cord for a core wire of the present invention can be used as various types of power-transmission belts, for example, friction power-transmission belts such as a V-belt and a V-ribbed belt, and meshing power-transmission belts such as a toothed belt and a double-sided toothed belt. Since the twisted cord for a core wire of the present invention has the elongation of the core wire required during the production, has reduced elongation of the core wire during use and has a high tensile strength, the twisted cord is suitable as a core wire for a V-ribbed belt used to drive an auxiliary machine for an automobile engine, and particularly, can be suitably used as a core wire of a V-ribbed belt for driving an ISG-equipped engine in which high dynamic tension generates.

Although the preferred embodiment of the present invention has been described above, the present invention is not limited to the above-described embodiment, and various design changes can be made as long as it is described in the claims. The present application is based on Japanese Patent Application No. 2019-093051 filed on May 16, 2019 and Japanese Patent Application No. 2020-081456 filed on May 1, 2020, the contents of which are incorporated herein by reference.

REFERENCE SIGNS LIST

1 Core wire
2 Compression rubber layer
3 V-rib portion
4 Adhesive rubber layer
5 Tension Layer

The invention claimed is:

1. A twisted cord for constituting a core wire of a power-transmission belt, the twisted cord comprising a plurality of primary twisted yarns that are bundled and secondarily-twisted,
   wherein when the secondary twist is untwisted by 25 cm, a difference in length between the longest primary twisted yarn L and the shortest primary twisted yarn S among the plurality of primary twisted yarns is 1 to 10 mm, and
   wherein the primary twisted yarn L comprises a high-modulus fiber, and the primary twisted yarn S comprises a low-modulus fiber.

2. The twisted cord according to claim 1, wherein a twist coefficient of the primary twisted yarn L is 2 to 5 times a twist coefficient of the primary twisted yarn S.

3. The twisted cord according to claim 1, being a Lang lay cord.

4. The twisted cord according to claim 1, wherein the plurality of primary twisted yarns comprise a plurality of primary twisted yarns comprising the high-modulus fiber and one primary twisted yarn comprising the low-modulus fiber.

5. The twisted cord according to claim 1, wherein a mass ratio of the high-modulus fiber to the low-modulus fiber (the former/the latter) is 60/40 to 95/5.

6. A method of producing a twisted cord according to claim 1, wherein the plurality of primary twisted yarns are secondarily-twisted while setting a tension applied to the primary twisted yarn S to be larger than a tension applied to the primary twisted yarn L.

7. The method of producing the twisted cord according to claim 6, wherein the tension applied to the primary twisted yarn S is 0.12 to 0.53 gf/dtex.

8. A power-transmission belt comprising a core wire comprising the twisted cord according to claim 1.

9. The power-transmission belt according to claim 8, being a V-ribbed belt.

10. A method of using the twisted cord according to claim 1 as a core wire of a power-transmission belt.

\* \* \* \* \*